(12) United States Patent
Browne et al.

(10) Patent No.: US 11,560,904 B2
(45) Date of Patent: Jan. 24, 2023

(54) MODULAR LOW-NOISE MOTOR

(71) Applicant: ABB Schweiz AG, Baden (CH)

(72) Inventors: Stephen Douglas Browne, Shelby, NC (US); Tracy Murphree, Woodruff, SC (US); Christopher A. Stockton, Greenville, SC (US); Matthew Truett, Simpsonville, SC (US)

(73) Assignee: ABB Schweiz AG, Baden (CH)

( * ) Notice: Subject to any disclaimer, the term of this patent is extended or adjusted under 35 U.S.C. 154(b) by 265 days.

(21) Appl. No.: 16/141,234

(22) Filed: Sep. 25, 2018

(65) Prior Publication Data

US 2020/0096008 A1 Mar. 26, 2020

(51) Int. Cl.

| | |
|---|---|
| F04D 29/66 | (2006.01) |
| F04D 29/40 | (2006.01) |
| H02K 9/06 | (2006.01) |
| F04D 29/58 | (2006.01) |
| H02K 5/24 | (2006.01) |
| F04D 25/16 | (2006.01) |
| F04D 25/06 | (2006.01) |

(52) U.S. Cl.
CPC ....... *F04D 29/665* (2013.01); *F04D 25/0606* (2013.01); *F04D 25/166* (2013.01); *F04D 29/403* (2013.01); *F04D 29/5806* (2013.01); *H02K 5/24* (2013.01); *H02K 9/06* (2013.01)

(58) Field of Classification Search
None
See application file for complete search history.

(56) References Cited

U.S. PATENT DOCUMENTS

| | | | | |
|---|---|---|---|---|
| 2,731,194 A | * | 1/1956 | Kent | A47L 5/22 |
| | | | | 417/312 |
| 3,249,172 A | * | 5/1966 | De Lorean | B62D 25/12 |
| | | | | 180/68.3 |
| 3,780,397 A | * | 12/1973 | Harbeck | A47L 5/12 |
| | | | | 15/413 |
| 3,848,290 A | * | 11/1974 | Bates | A47L 11/4044 |
| | | | | 15/321 |
| 3,949,727 A | * | 4/1976 | Thien | F02B 77/13 |
| | | | | 123/198 E |
| 4,077,383 A | * | 3/1978 | Hatz | F02B 77/13 |
| | | | | 123/195 C |

(Continued)

*Primary Examiner* — Peter J Bertheaud
*Assistant Examiner* — Geoffrey S Lee
(74) *Attorney, Agent, or Firm* — Leydig, Voit & Mayer, Ltd.

(57) ABSTRACT

A modular fan cover assembly for inclusion on an electric motor is selectively configurable for degrees of reduced noise operation. The modular fan cover assembly includes a plurality of cooperating components arranged to direct fluid communication through the assembly. The components may include, for example, a fan cover defining a fan chamber for enclosing the fan, an inlet cover including an inlet chamber and a plurality of inlet apertures, and a silencing insert selectively includable with the fan cover assembly that may include one or more silencing features. The selective combination of the components can redirect airflow through various turns or bend in the modular fan cover assembly to trap or suppress noise propagating from the electric motor. The modular fan cover assembly may be operatively equipped with a blower assembly.

17 Claims, 9 Drawing Sheets

(56) References Cited

U.S. PATENT DOCUMENTS

| | | | | |
|---|---|---|---|---|
| 4,114,231 | A * | 9/1978 | Nauta | A47L 7/0009 15/413 |
| 4,195,969 | A * | 4/1980 | Whitney | A47L 9/0081 15/412 |
| 4,211,058 | A * | 7/1980 | Larsen | A01D 34/82 56/17.5 |
| 4,213,224 | A * | 7/1980 | Miller | A47L 5/24 15/344 |
| 4,280,245 | A * | 7/1981 | Hiester | A47L 9/0081 15/326 |
| 4,330,899 | A * | 5/1982 | Miller | A47L 9/00 15/326 |
| 4,361,928 | A * | 12/1982 | Schulz | A47L 11/4097 15/326 |
| 4,435,877 | A * | 3/1984 | Berfield | A47L 9/0081 15/326 |
| 4,512,713 | A * | 4/1985 | Berfield | A47L 9/0081 415/119 |
| 4,538,971 | A * | 9/1985 | Miller | A47L 7/0028 15/327.2 |
| 4,547,206 | A * | 10/1985 | Sovis | A47L 5/365 15/353 |
| D283,065 | S * | 3/1986 | Maier | D32/23 |
| D283,066 | S * | 3/1986 | Maier | D32/23 |
| 4,651,380 | A * | 3/1987 | Ogden | A47L 5/22 15/321 |
| 4,665,581 | A * | 5/1987 | Oberdorfer | A47L 9/0081 15/326 |
| 4,733,750 | A * | 3/1988 | Poirier | F02B 63/04 181/202 |
| 4,735,555 | A * | 4/1988 | Erickson, Jr. | A47L 9/22 417/244 |
| 4,824,333 | A * | 4/1989 | Erickson, Jr. | A47L 9/188 403/349 |
| 5,124,600 | A * | 6/1992 | Hedeen | H02K 9/06 310/51 |
| 5,155,876 | A * | 10/1992 | Whitaker | A47L 11/305 15/320 |
| 5,289,612 | A * | 3/1994 | Glenn, III | A47L 9/0081 15/326 |
| 5,353,469 | A * | 10/1994 | Fellhauer | A47L 7/0028 15/326 |
| 5,365,633 | A * | 11/1994 | Sunagawa | A47L 9/0081 15/326 |
| 5,400,463 | A * | 3/1995 | Attard | A47L 5/38 15/314 |
| 5,479,676 | A * | 1/1996 | Martin | A47L 5/00 15/323 |
| 5,567,127 | A * | 10/1996 | Wentz | A47L 7/00 415/119 |
| 5,743,721 | A * | 4/1998 | Graham | F04D 25/082 310/58 |
| 5,873,143 | A * | 2/1999 | Huey | A47L 5/28 15/351 |
| 6,003,200 | A * | 12/1999 | Potts | A47L 7/0028 15/327.2 |
| 6,158,083 | A * | 12/2000 | Holsten | A47L 5/365 15/326 |
| 6,167,976 | B1 * | 1/2001 | O'Neill | B62D 25/10 123/41.49 |
| 6,171,054 | B1 * | 1/2001 | Mann, III | F04D 25/04 415/119 |
| 6,175,988 | B1 * | 1/2001 | White | A47L 5/365 15/323 |
| 6,219,880 | B1 * | 4/2001 | Worden | A47L 5/365 15/327.6 |
| 6,264,427 | B1 * | 7/2001 | Berfield | A47L 5/22 415/108 |
| 6,325,844 | B1 * | 12/2001 | Mead | A47L 9/0081 55/467 |
| 6,385,809 | B1 * | 5/2002 | Martin | A47L 5/14 15/326 |
| 6,530,116 | B2 * | 3/2003 | Berfield | A47L 5/14 15/328 |
| 6,579,060 | B1 * | 6/2003 | Mann, III | A47L 5/22 15/326 |
| 6,779,228 | B2 * | 8/2004 | Plomteux | A47L 5/38 15/314 |
| 6,804,857 | B1 * | 10/2004 | Olewiler, III | A47L 5/22 15/326 |
| D534,697 | S * | 1/2007 | Reick-Mitrisin | D32/21 |
| 7,287,301 | B2 * | 10/2007 | Marshall | A47L 5/225 15/327.6 |
| D566,912 | S * | 4/2008 | Reick-Mitrisin | D32/21 |
| 7,406,744 | B2 * | 8/2008 | Bruneau | A47L 5/22 15/301 |
| 7,461,430 | B2 * | 12/2008 | Reick-Mitrisin | A47L 5/38 15/314 |
| 7,614,113 | B2 * | 11/2009 | Roney | A47L 9/0081 15/327.2 |
| 9,752,494 | B2 * | 9/2017 | Le Roy | F04D 29/582 |
| 10,077,707 | B2 * | 9/2018 | Le Roy | F04D 29/424 |
| 10,557,402 | B2 * | 2/2020 | Le Roy | F04D 29/4213 |
| 2001/0007292 | A1 * | 7/2001 | Yabf | F01P 11/12 180/68.1 |
| 2004/0083701 | A1 * | 5/2004 | Brower | F01N 13/002 56/320.1 |
| 2006/0185931 | A1 * | 8/2006 | Kawar | G06F 1/18 181/202 |
| 2014/0271134 | A1 * | 9/2014 | Le Roy | F04D 29/665 415/119 |
| 2018/0229468 | A1 * | 8/2018 | Olmsted | B32B 5/02 |

* cited by examiner

MODULAR LOW-NOISE MOTOR

BACKGROUND

Electric motors such as alternating current induction motors often require cooling to remove the heat generated during operation. To provide that cooling, electric motors are sometimes equipped with fans arranged to direct airflow externally around the motor housing or in some cases into the motor housing. A fan cover may be provided to enclose the fan and may include apertures to direct ambient air around or into the motor. In addition, the apertures may be arranged to facilitate the airflow to improve cooling and/or motor operation.

DETAILED DESCRIPTION

Figure 1:
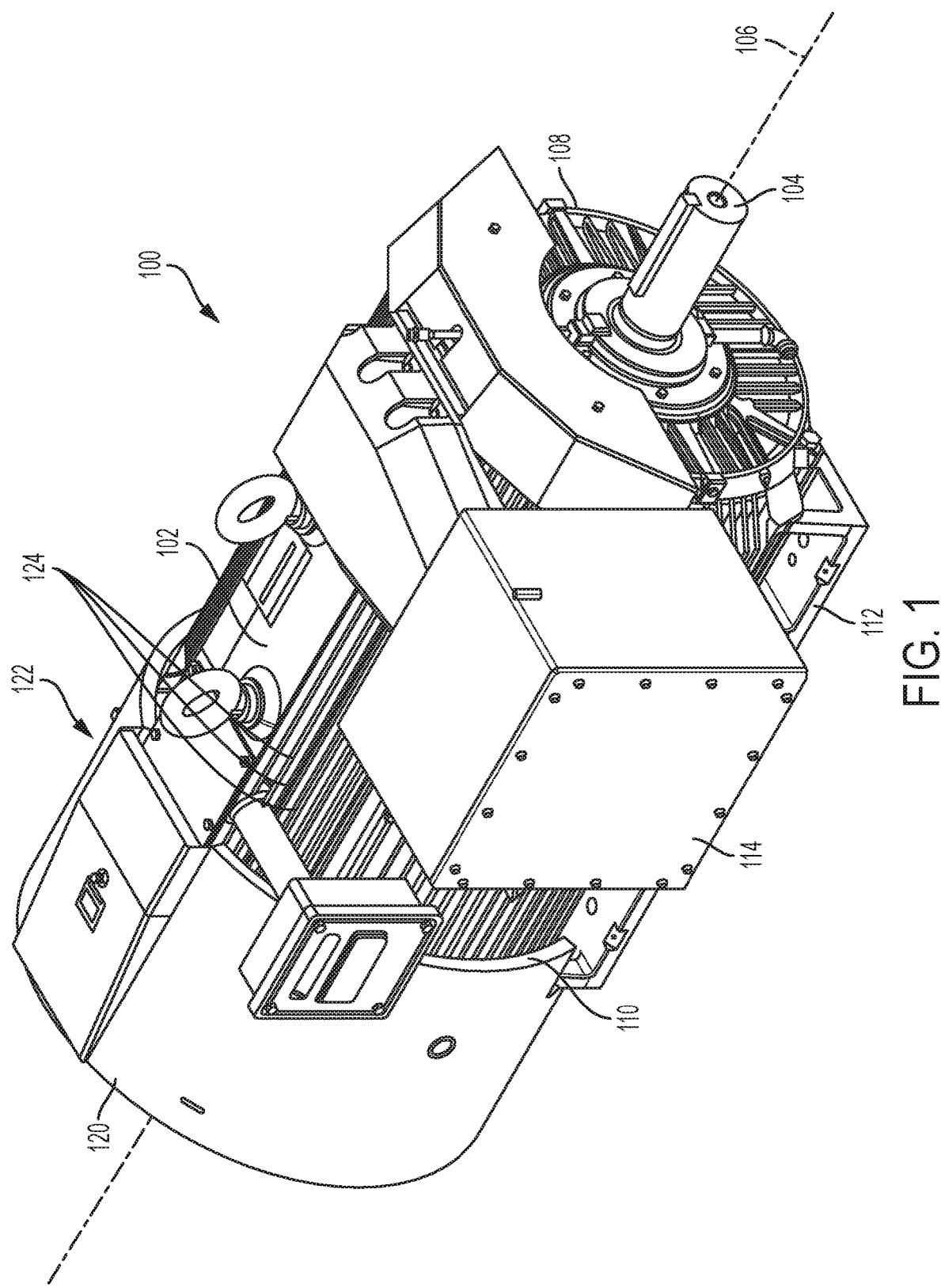
FIG. 1 is perspective view of an electric motor showing the exterior of the motor housing and configured in a totally enclosed, fan cooled arrangement according to an example of the disclosure.
Figure 2:
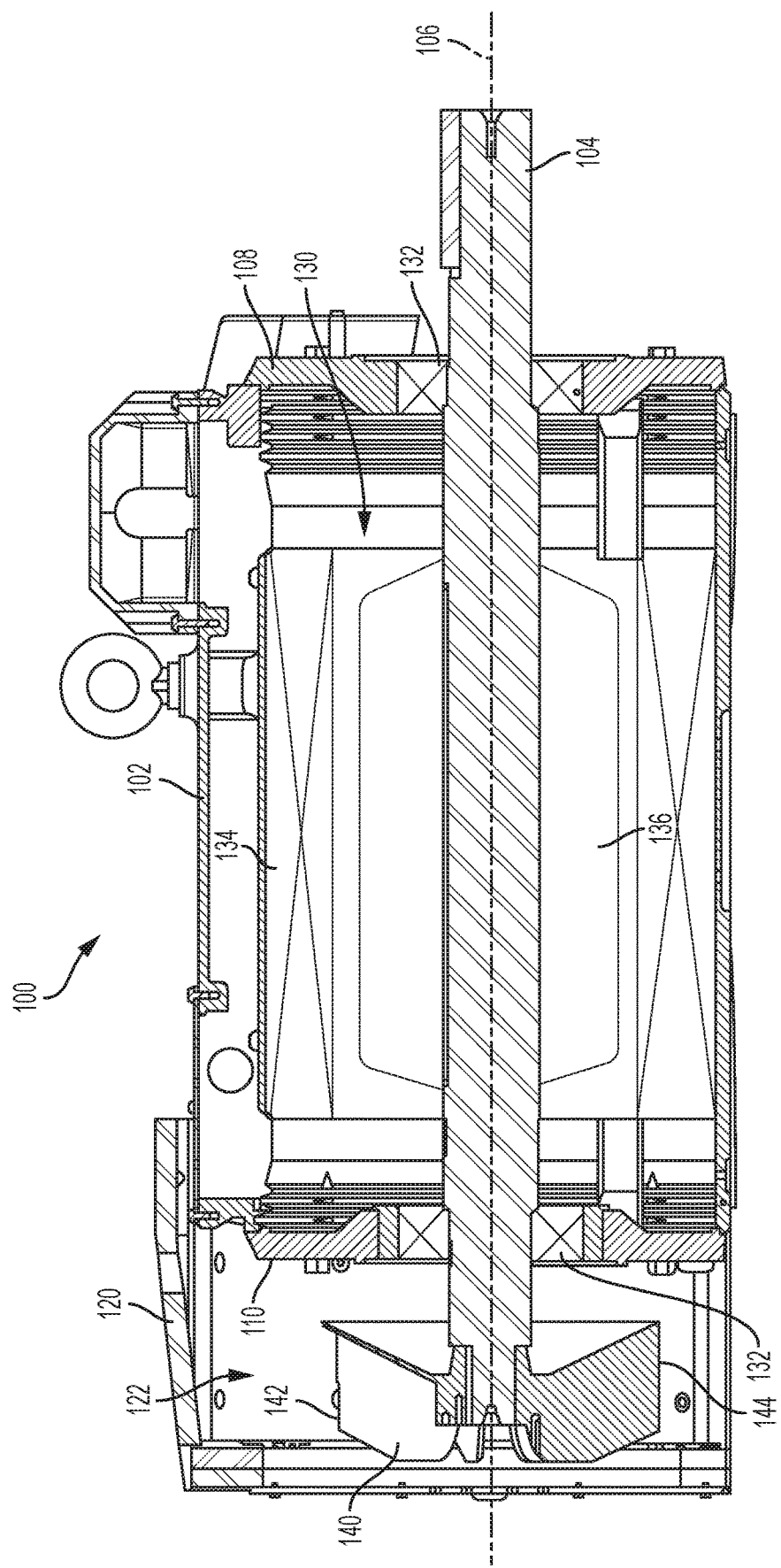
FIG. 2 is a partial cross-sectional view of the electric motor illustrating the internal components including a fixedly disposed stator, a rotor rotatably arranged with respect to the stator, and a fan mounted on a motor shaft of the rotor according to an example of the disclosure.

Now referring to the drawings, wherein like reference numbers refer to like elements, there is illustrated in FIGS. 1 and 2 an example of an electric induction motor 100 in accordance with the present disclosure. Electric motors convert electrical energy into mechanical power in the form of a rotating shaft that can be utilized for performing other work. The illustrated example of an electric motor 100 includes an enclosure or motor housing 102 with the rotatable motor shaft 104 protruding from the front face of the motor housing and that thereby defines the axis of rotation of the motor axis 106. The motor shaft 104 therefore passes through a front end housing 108 which is located axially opposite a rear end housing 110 and which defines the axial length of the electric motor 100. In the illustrated example, the motor housing 102 can be generally cylindrical in shape, but the motor housing 102 may have other suitable shapes such as rectangular. The motor housing 102 can include mounting feet 112 so that the electric motor 100 can be mounted in a horizontal orientation with respect to the ground, although in other examples, other mounting orientations and configurations are possible. To connect to and receive electrical power for operation via wiring or other conductors, a wiring box 114 can be disposed on the exterior of the motor housing 102. The electrical motor 100 can operate on any suitable electrical power source including without limitation alternating current or direct current, single phase or three phase, 50 hertz frequency or 60 hertz frequency, and at any suitable voltage.

Various styles of enclosures and frame sizes exist depending on the intended application of the electric motor 100. According to an example, the electric motor 100 can be a total enclosed fan cooled (TEFC) motor. The motor housing 102 may be totally enclosed from the external environment to prevent dirt, debris, or liquids from entering the internal workings of the electric motor 100. In TEFC designs, the motor housing and end housings may be made as separate components assembled together or various components may be cast together. To cool the electrical motor in a TEFC design, a modular external fan cover assembly 120 can house and secure a fan assembly 122 proximate to the rear end housing 110. The motor housing 102 may also include a plurality of radially extending ribs 124 oriented parallel to the motor axis 106. In operation, the fan assembly 122 directs air across the exterior surface of the motor housing 102 between the ribs 124 to carry away heat. In addition to the TEFC design, other examples of electric motors may have different enclosure configurations such as an open drip proof design (ODP) that may include air vents to the internal spaces and components of the motor, or the motor may be designed for operation in hazardous locations.

Referring to FIG. 2, there is illustrated an example of the internal components of the electric motor 100 according to an example of the disclosure. The motor housing 102 is a generally hollow structure that defines an enclosed space 130 when the front end housing 108 and the rear end housing 110 are included thereon. In an example, the front end housing 108 and the rear end housing 110 may be secured to the motor housing 102 by bolts, welding or other attachment means, or the front and rear end housing and the motor housing may be cast together in various arrangements. The motor shaft 104 may extend across and beyond the full axial length between the opposing front and rear end housings 108, 110. To rotatably support the motor shaft 104 in its orientation with respect to the motor axis 106, ball bearing 132 or the like can be press fit or secured in appropriate apertures in the front and rear end housings 108, 110.

To cause the motor shaft 104 to rotate, there is disposed inside the motor housing 102 an electromagnetically interacting stator 134 and a rotor 136. The stator 134 can be a stationary annular structure fixedly mounted to the motor housing 102 concentric about the motor axis 106. In an AC induction motor, the stator 134 may be made of a plurality of windings or coils which are conductive and which electrically couple to the external source of electricity. The rotor 136 can be formed of a rotor assembly 138 that is attached to and radially disposed about the motor shaft 104 such that, in operation, the rotor assembly rotates with motor shaft.

The rotor assembly can be made of a corresponding set of electromagnetically reactive coils, bars, or laminations. When alternating current is supplied to the stator 134, it generates a rotating magnetic field that induces a current to flow in the conductors of the rotor 136. The flow of current in the rotor 136 produces a secondary magnetic field that interacts with the rotating magnetic field or flux from the stator 134 causing the rotor to follow the primary field and generate rotary motion and torque. However, other examples may use different principles of operation.

To dissipate heat generated by the electromagnetic interaction, frictional movement and to cool the motor, a fan assembly 122 may be disposed on the rear end housing 110 and is enclosed by the fan cover assembly 120. The fan assembly 122 may include an impeller 140 operatively coupled to and driven by the motor shaft 104. The impeller 140 may be mounted by its hub 142 to the motor shaft 104 and has a plurality of radially extending blades or vanes 144. The vanes 144 may be angled or shaped so that when the motor shaft 104 rotates, the impeller 140 creates an airflow by redirecting the air generally in the axial direction parallel to the motor axis 106. The impeller 140 may also be indirectly coupled to and rotated by the motor shaft 104. In the illustrated TEFC design, the fan cover assembly 120 may be sized to fit about the rear end housing 110 and provide gaps or spaces allowing the airflow to flow over the remainder of the motor housing 102 generally in the axial direction. In other enclosure designs, the airflow may be directed to different locations such as into the enclosed space 130 in the motor housing 102 or through passages disposed into the motor housing.

Figure 3:
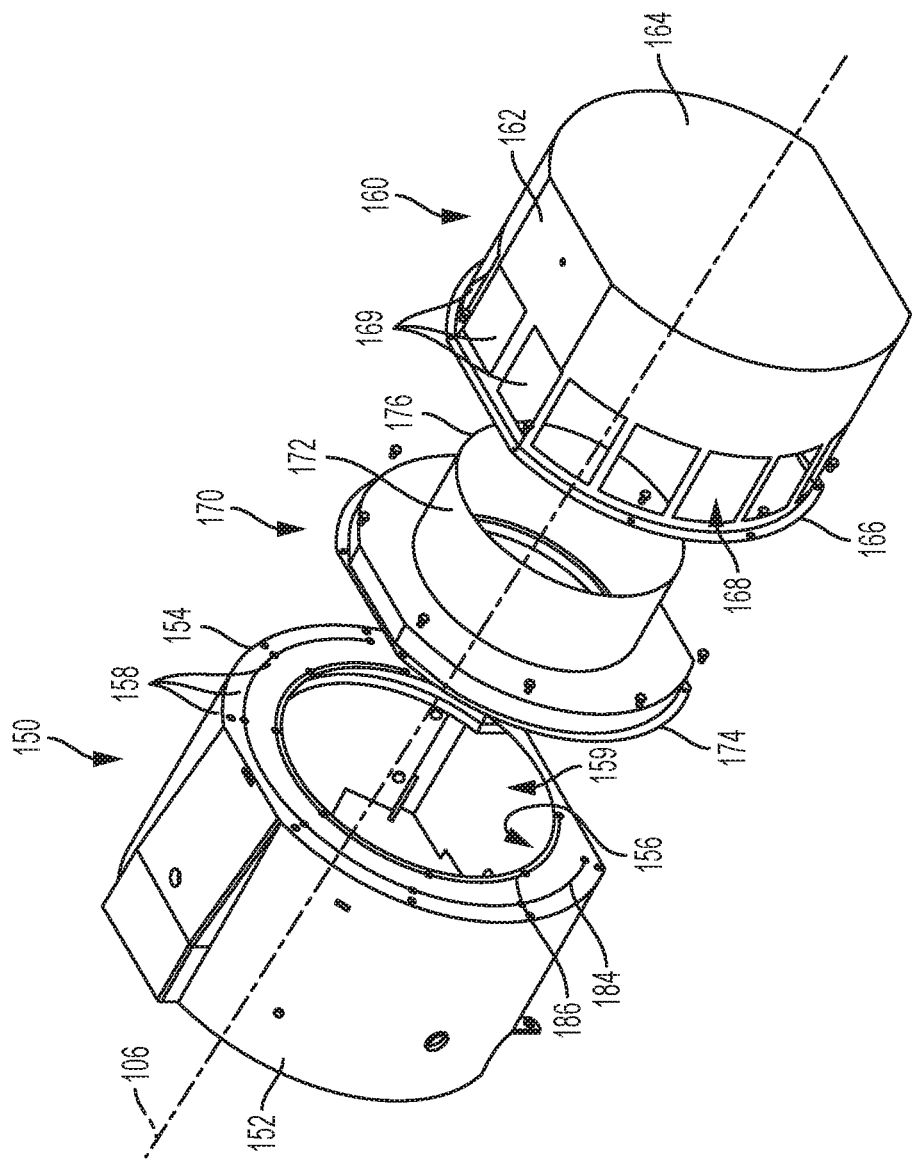
FIG. 3 is a perspective assembly view of the components of the modular fan cover assembly for mounting to the rear end of the electric motor and directing airflow to cool the motor during operation according to an example of the disclosure.

In an example of the disclosure, the fan cover assembly 120 can have a modular configuration or design enabling reconfiguration for various degrees of low noise operation depending upon the intended application of the electric motor 100. Referring to FIG. 3, in accordance with an example of the disclosure, the modular configuration can include a plurality of cooperative components including a fan cover 150, an inlet cover 160, and a low noise silencing insert 170. The fan cover 150 can be a generally annular structure including an elongated cylindrical sleeve 152 circumferentially disposed around the motor axis 106 and that terminates at one axial end in an annular mounting panel 154. The sleeve 152 can be adapted to fit around and attach to the rear end housing 110 of the motor housing 102 in FIG. 1. The mounting panel 154 extends partially radially inwards toward the motor axis 106 to provide an annular surface arranged perpendicular to the motor axis 106 and which defines an opening 156 into the sleeve 152. The opening 156 may be circular or may have any other suitable shape and may be arranged concentric with respect to the motor axis 106.

To mount the other components of the fan cover assembly, the mounting panel 154 may include a plurality of radially arranged mounting holes 158 adapted to receive fasteners. When assembled to the motor housing 120, the fan cover 150 defines a fan chamber 159 that can accommodate and enclose the impeller 140 of the external fan assembly 122. When the fan cover 150 is mounted to the motor housing, the impeller 140 is disposed axially forward of the mounting panel 154 and the fan chamber 159 can be accessed via the opening 156. In operation, a flow-through grill may be provided to close the opening 156 to the fan enclosure 159 and airflow may be drawn into the fan chamber 159 directly from the environment. As an example, to further assist in noise reduction, insulation in the form of open or closed celled polyurethane foam, woven steel or metal fibers, or the like can be attached about the fan cover 140.

The inlet cover 160 can be a shell-like structure including a hollow peripheral casing 162 extending concentrically around and along the motor axis 106 and that is closed at one end by an axially arranged rear faceplate 164. At the other axial end, the peripheral casing 162 can include a mounting rim 166 adapted to abut against and mount to the mounting panel 154 on the fan cover 150 using fasteners or the like. The peripheral casing 162 and rear faceplate 164 provide a drawn or deep-set cavity or inlet chamber 168 for accommodating the silencing insert 170 when the inlet cover 160 is mounted to the fan cover 150. To provide airflow communication to the inlet chamber 168, there can be a plurality of radially arranged inlet apertures 169 disposed through the peripheral casing 162 proximate the mounting rim 166. In some examples, the inlet apertures 169 may be provided in any suitable shape or dimension and in any suitable number or arrangement. The inlet cover 160 can be made from any suitable material including drawn or formed sheet metal.

Some examples of an electric motor described herein may provide noise reduction or noise suppression by configuring the silencing insert 170 with features or shapes to redirect or isolate acoustical soundwaves generated by the fan assembly and/or electric motor. For example, the silencing insert 170 can include a silencing feature in the form of a baffling tube or pipe 172 concentrically disposed about the motor axis 106 and extending axially from an annular flange 174 that is arranged perpendicular to the motor axis 106 and that extends radially outward. The annular flange 174 may correspond in shape to the mounting panel 154 to enable the silencing insert 170 to abut against and mount to the fan cover 150. The baffling pipe 172 can be cylindrical in shape, although other shapes are contemplated, and can have a diameter sized to enable the baffling pipe to be received into the peripheral casing 162 of the inlet cover 160 and protrude into the inlet chamber 168. The baffling pipe 172 can terminate at a rearward disposed inlet rim 176 providing access to the interior of the baffling pipe 172. In an example of the disclosure, the baffling pipe 172 may include radially disposed perforations. In other examples, the silencing insert 170 may include additional or different silencing features such as additional baffles, perforations, vents, or chamber configurations to assist in redirecting soundwaves. In the present example, the silencing features included with the silencing insert 170 can provide noise suppression and reduction by, for example, redirecting, isolating or dissipating sound waves propagating from the internal workings of the electric motor 100. For example, the silencing insert 170 may include a plate arranged perpendicular to the motor axis 106 with a plurality of perforations, or may include a plate with a plurality of axially extending baffling tubes disposed concentrically with each other or adjacently arranged next to each other.

Figure 4:
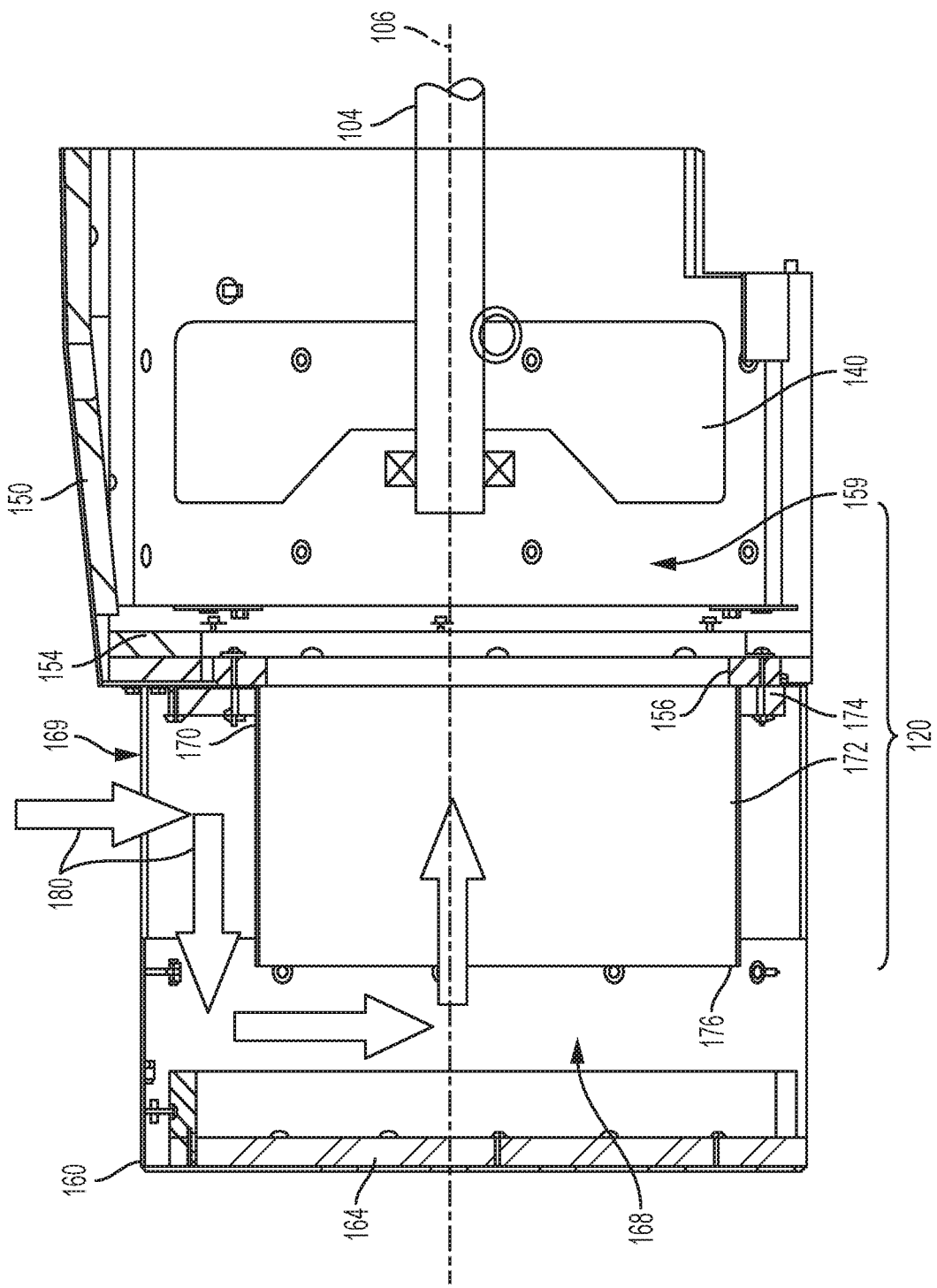
FIG. 4 is a cross-sectional schematic diagram illustrating airflow with respect to the electric motor with the modular fan cover assembly configured for low noise operation according to an example of the disclosure.

Referring to FIG. 4, there is illustrated an example of the modular fan cover assembly 120 assembled in the reduced noise configuration with the inlet cover 160 mounted to the fan cover 150 and the silencing insert 170 disposed in the inlet cover. In operation, rotation of the motor shaft 104 rotates the impeller 140 that draws airflow axially forward with respect to the motor axis 106. To suppress or mitigate noise, the low noise configuration of the fan cover assembly 120 is arranged to cause the airflow, indicated by arrows 180, through the fan cover assembly to follow or be redirected through a tortuous or indirect path. In other words, in this example, inclusion of the silencing insert 170 establishes indirect fluid communication between the inlet chamber 168 and the fan chamber 159. For example, airflow 180 from the external ambient air may initially enter the inlet chamber 168 through the plurality of inlet apertures 169. Because of the radial arrangement of the inlet apertures 169, the airflow 180 is initially directed radial inwards to the motor axis 106. To redirect the radial airflow 180 approximately 90° and axially rearward, the inlet apertures 169 can be located axially coextensive with the extension of the baffling pipe 172 protruding rearward into the inlet chamber 168. Hence, the airflow 180 is redirected axially rearward toward the inlet rim 176 of the baffling pipe 172. Airflow 180 directed past the inlet rim 176 of the baffling pipe 172 encounters the rear faceplate 154, which is spaced apart from the inlet rim and which again redirects airflow radially inward and into the baffling pipe 172 via the inlet rim. The airflow 180 hence undergoes 180° redirection into the baffling pipe 172 and is drawn axially forward through the fan chamber opening 156 into the fan chamber 159 by the impeller 140. Multiple redirections of airflow through the fan cover assembly 120 reduces noise by dampening or dissipating soundwaves propagating from the fan chamber 159. In the illustrated example, the airflow is directed through approximately three 90° bends.

Figure 5:
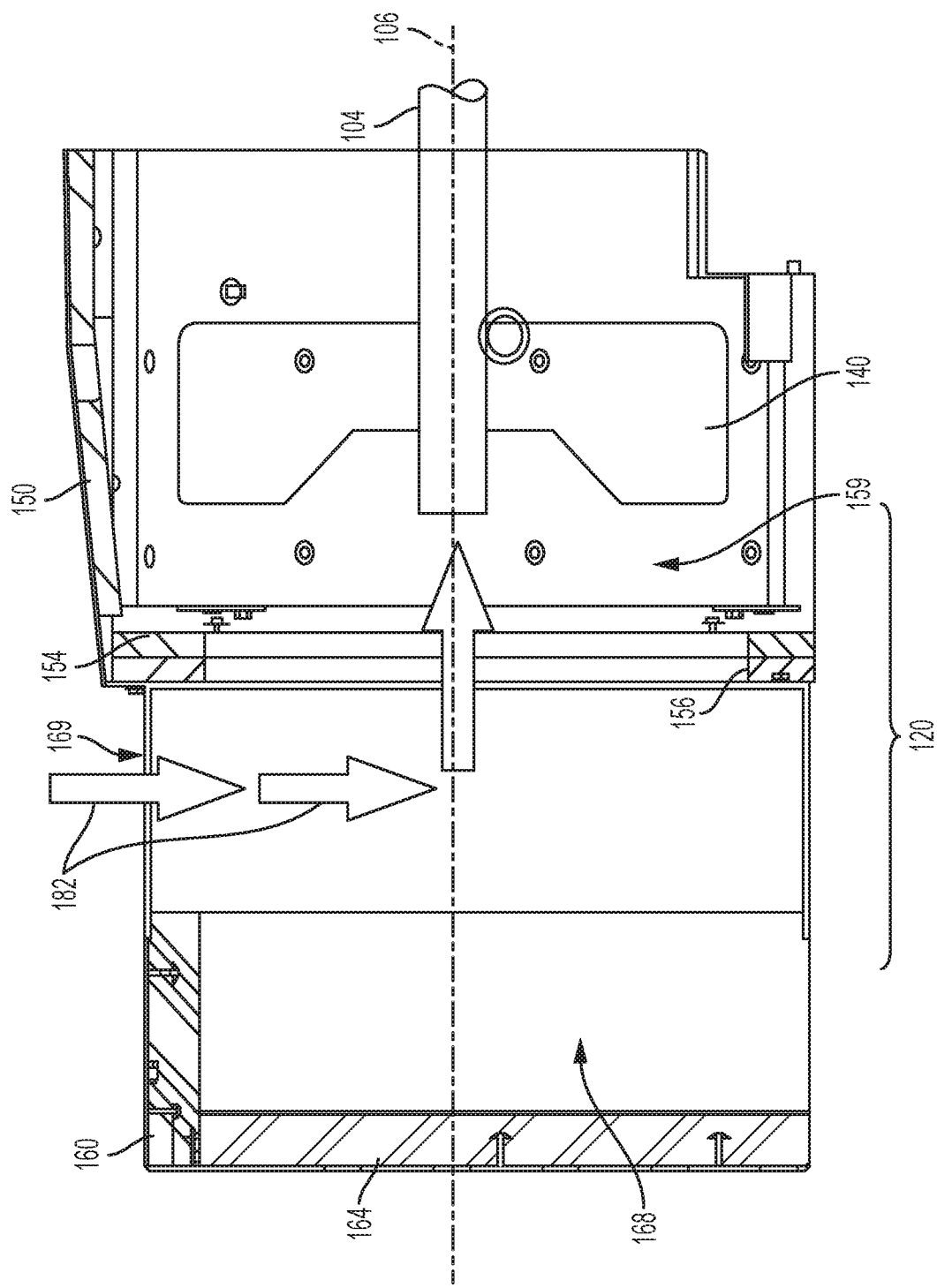
FIG. 5 is a cross-sectional schematic diagram illustrating airflow with respect to the electrical motor with the modular fan cover assembly configured for standard operation according to an example of the disclosure.

Referring to FIG. 5, there is illustrated an example of the modular fan cover assembly 120 configured for reduced noise operation without the silencing insert. In this example, the silencing insert can be removed from the modular fan cover assembly 120 and just the fan cover 150 and the inlet cover 160 are attached to the motor housing, thereby reducing the tortuous path for the airflow. For example, the airflow now indicated by arrows 182 can enter the inlet chamber 168 defined within the inlet cover 160 via the plurality of inlet apertures 169 such that the airflow is initially in the radially inward direction toward the motor axis 106. Due to removal of the silencing insert, the airflow 182 has a less obstructed path to the opening 156 disposed into the mounting panel 154 of the fan cover 150 and the fan chamber 159 and inlet chamber 168 directly interface through the opening 156 and fluid communication between the chambers is more directly established. The airflow 182 is therefore directed through a single, approximately 90° turn to enter the fan chamber 159 defined in the fan cover 150. While in the present example, the noise attenuation provided by the tortuous path created by the silencing insert is reduced, the redirection of airflow through the approximate 90° turn continues to provide reduction in noise emitted from the motor via the fan chamber 159.

Figure 6:
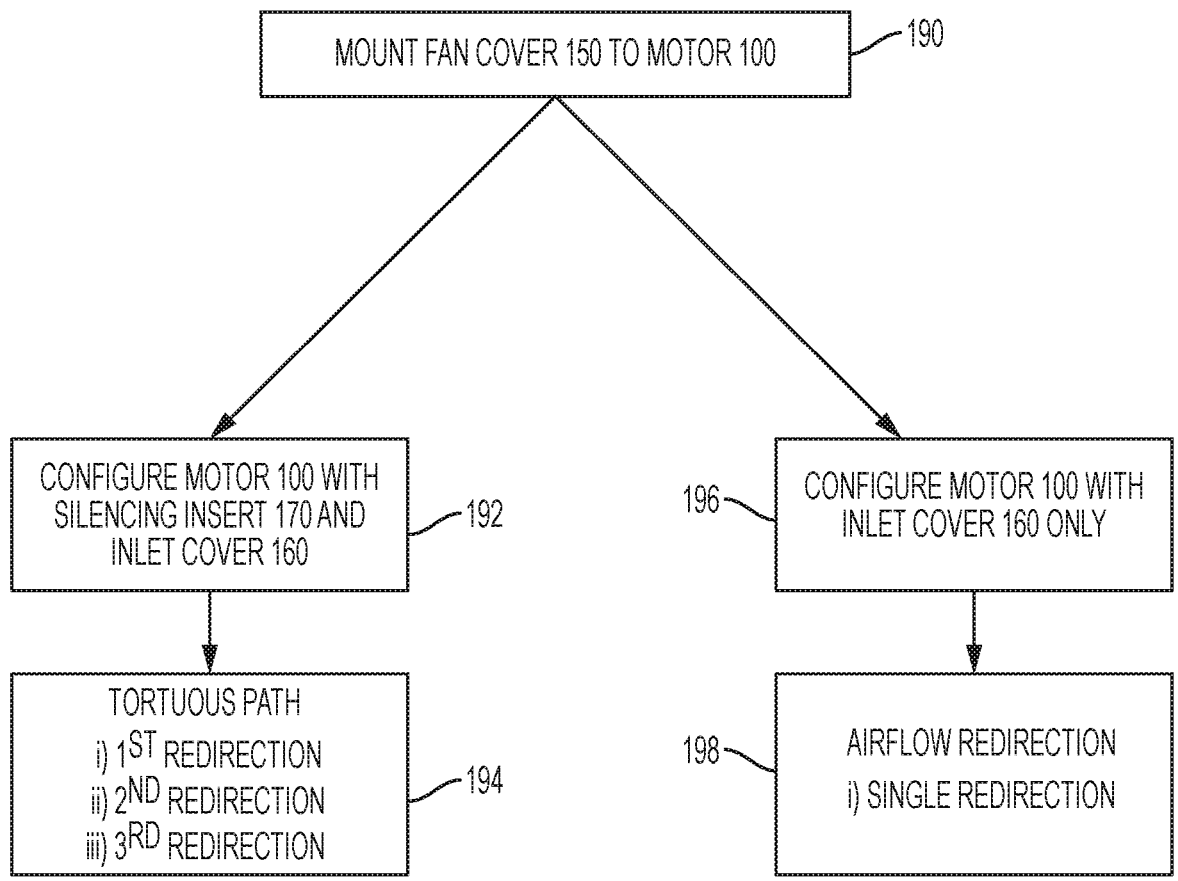
FIG. 6 is a schematic representation of the process chart illustrating airflow with respect to different examples of the modular fan cover.

Referring to FIG. 6, there is illustrated a process chart illustrating operation of the modular fan cover assembly 120 according to some of the examples. In an initial step 190, a fan cover 150 in accordance with the examples herein may be mounted to electric motor 100 to enable further selective configuration of the motor. If the electric motor 100 is intended for reduced noise operation, a first configuration step 192 can occur in which the silencing insert 170 may be mounted to the fan cover 150 and may be accommodated in the inlet cover 160 also mounted to the fan cover 150. The first configuration step 192 results in producing a tortuous airflow path 194 as described in the examples above in which the airflow is redirected multiple times through multiple turns to isolate and suppress sound waves from the motor 100. By way of example, the first configuration 194 may involve three distinct redirections of airflow through the fan cover assembly 120. If, however, the resulting noise suppression does not need to be substantial, a second configuration step 196 can occur in which only the inlet cover 160 is mounted to the fan cover 150 and the silencing insert 170 can be omitted. The second configuration 196 results in the airflow being redirected (e.g. redirection 198) through a single turn or bend resulting in a lesser degree of noise reduction than the first configuration 192. The modular fan cover assembly 120 thus allows for varying degrees or levels of noise suppression, with the lesser degrees of noise suppression being achieved with fewer components and complexity.

Figure 7:
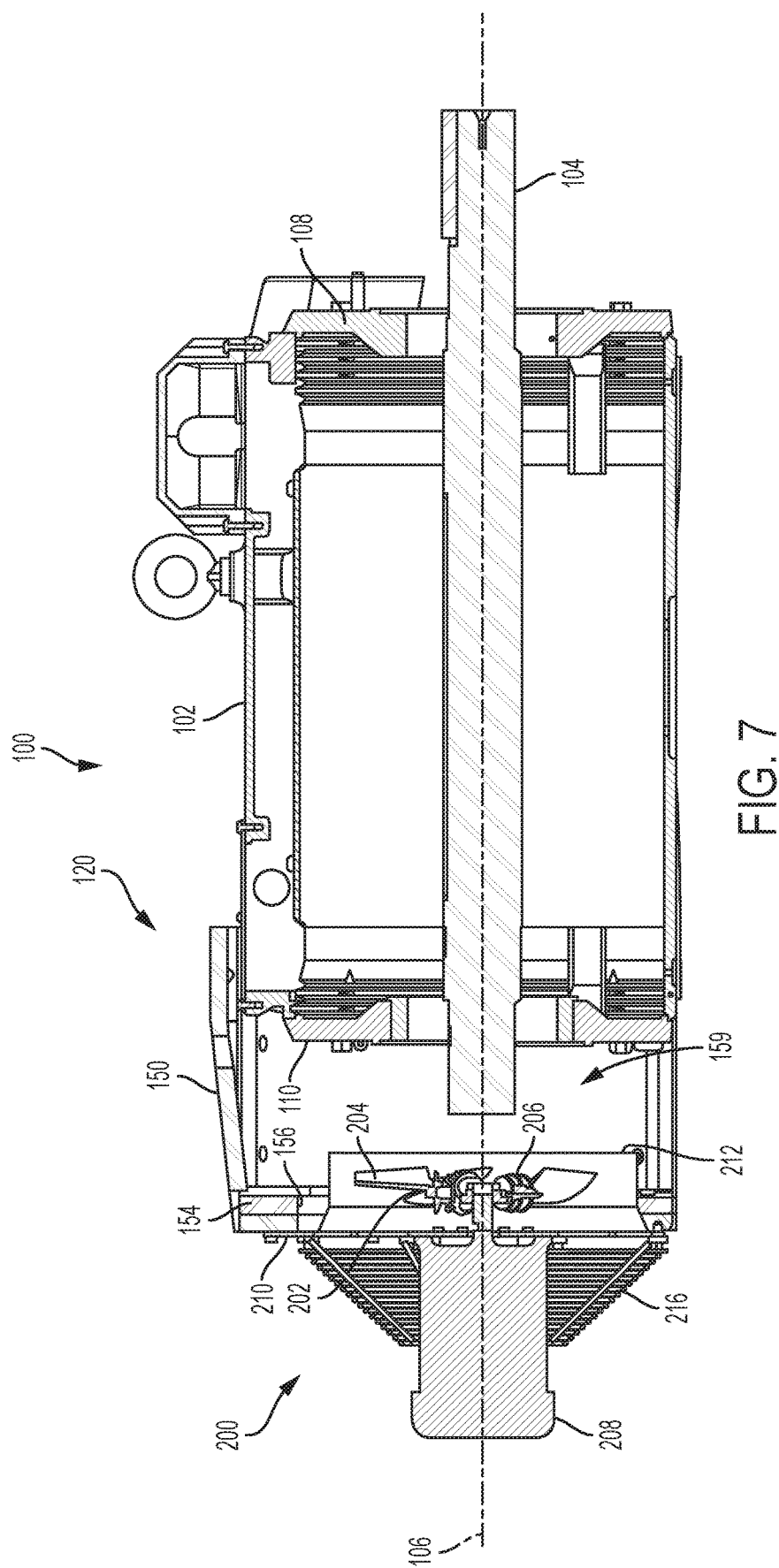
FIG. 7 is a cross-sectional schematic diagram of an electric motor operatively associated with a blower assembly to provide additional cooling and heat dissipation according to an example of the disclosure.
Figure 8:
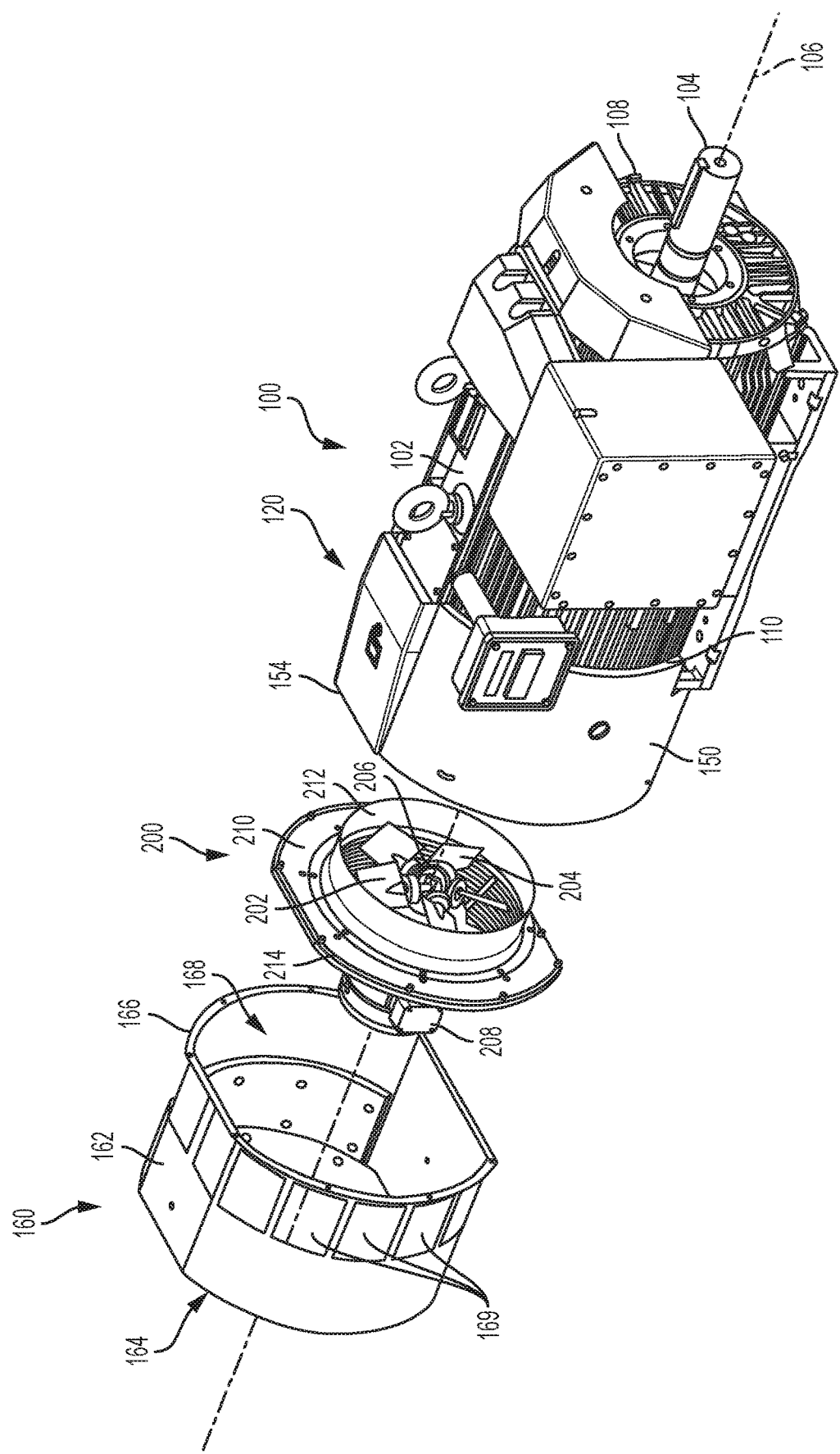
FIG. 8 is a perspective assembly view of the example of FIG. 6 illustrating the arrangement of the blower assembly as part of the modular fan cover assembly to further reduce noise according to an example of the disclosure.

To provide additional heat removal and cooling, in a further example of the disclosure and with reference to FIGS. 7 and 8, the electric motor 100 can be operated with a blower assembly 200 that forcibly directs airflow into the fan chamber 159. The blower assembly 200 may be configured as an additional, independently operated fan assembly mountable to the fan cover 150 to forcibly direct additional airflow in the axial direction into or over the motor housing 102. The blower assembly 200 can include a blower fan 202 having a plurality of blades or vanes 204 extending radially from a central hub 206. To rotate the blower fan 202, the blower assembly 200 can include an auxiliary blower motor 208 that may be operated and powered independently of the main electric motor 100 to which the blower assembly is attached. The blower motor 208 can include a stator and rotor and can operate on similar electromagnetic principals as described above.

To attach the blower assembly 200 to the fan cover 150 in the present example, the blower fan 202 and the blower motor 208 can be assembled to a blower plate 210. The blower plate 210 can be a planar plate having a shape or outline similar to the mounting plate 154 of the fan cover 150. The blower plate 210 may also include a fan sleeve 212 in a cylindrical or tubular shape extending therefrom that surrounds and extends coextensively over the blower fan 202 and which is sized and shaped to fit into the opening 156 through the mounting plate 154 of the fan cover 150. The blower plate 210 can be placed adjacent to the mounting plate 154 and attached to the fan cover 150 with bolts or similar fasteners as described below. Once mounted, the blower fan 202 and the blower motor 208 may be axially aligned with respect to the motor axis 106 with the blower fan directed forward toward the rear end housing 110 of the motor housing 102 and the fan sleeve 202 protruding into the fan chamber 159. In the examples utilizing a blower assembly 200, the impeller mounted to the motor shaft 104 may be removed, although in other examples utilizing blower assemblies, both the shaft mounted impeller and blower fan 202 may be included. To enable external air to be drawn into the fan chamber 159 by operation of the blower assembly 200, the blower plate 210 may include apertures or vents disposed to interface with the open 156 disposed in the mounting plate 154 and which are generally circumscribed by the fan sleeve 212.

In the example illustrated in FIG. 7, the blower assembly 200 can be attached directly to the fan cover 150 with the blower motor 208 exposed at and extending from the rear of the electric motor 100. In such a configuration, a blower frame 216 may be disposed around the blower motor 208 disposed externally of the mounting panel 154 on the fan cover 150, and may assist in supporting or protecting the components of the blower assembly 200 extending rearward from the mounting plate 154 of the fan cover 150. The blower fame 216 can have any suitable shape or configuration and can be vented or have apertures to allow external air to be drawn into the fan chamber 159 by operation of the blower assembly 200. Furthermore, to prevent foreign objects from encountering the blower fan 202, the blower support frame 216 may be configured to prevent or restrict access into the fan chamber 159 while still allowing external ambient air to be drawn therein. In the illustrated example, the blower fan 202, blower motor 208 and the blower frame 216 can be axially aligned and concentric with the motor axis 106 of the electric motor 100, but the alignment may be offset from the motor axis 106 in other examples. In the present example, with the components generally axially aligned, the blower assembly 200 may draw external airflow 218 into the fan chamber 159 generally along the axial direction with respect to the motor axis 106.

Figure 9:
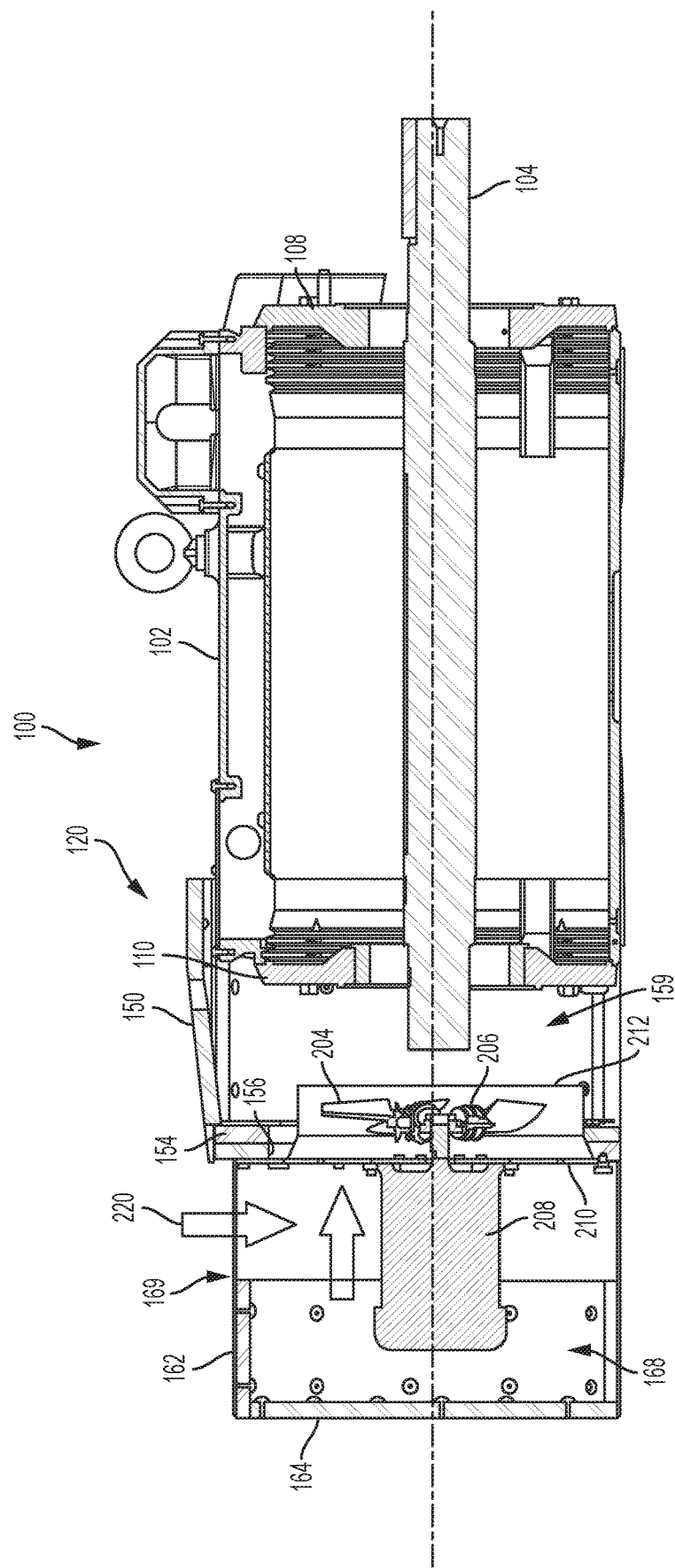
FIG. 9 is a cross-sectional schematic diagram illustrating the airflow with respect to the electric motor as directed through the blower assembly by the inlet cover according to an example of the disclosure.

Referring to FIGS. 8 and 9, in another example of the disclosure, the blower assembly 200 can be configured for cooperative operation with the other components of the modular fan cover assembly 120 to facilitate noise reduction. The blower assembly 200 can be attached to the motor housing 102 in the foregoing manner with the blower plate 210 adjacent and secured to the mounting plate 154 of the fan cover 150 by suitable fasteners. The blower support frame 216 as shown in FIG. 6 may be removed. To accommodate the components of the blower assembly 200 protruding externally of the fan cover 150, the inlet cover 160 can also be mounted to the mounting plate 154 of the fan cover 150 so that the blower motor 208 is disposed in the inlet chamber 168. Hence, the blower motor 208 is axially directed rearward toward the rear faceplate 164 and radially surrounded by the peripheral casing 162 of the inlet cover 160. Hence, the inlet cover 160 protects against access to the blower assembly 200 while allowing for external ambient air to be drawn into the inlet chamber 168 via the plurality of radially disposed inlet apertures 169.

In the present example, when the blower assembly 200 is operating, ambient external airflow indicated by arrows 220 will be drawn through the inlet apertures 169 initially in the radial direction as indicated in FIG. 9. To be directed axially forward into the fan chamber 159 and onto the remainder of the electric motor 100, the airflow 220 must be redirected through a 90° bend to align with the motor axis 106. Hence, as in the examples above, the 90° bend generated by the inlet cover 160 can facilitate noise reduction by obstructing sound propagating from the blower assembly 200. The 90° bend may also isolate and suppress soundwaves propagating from the blower assembly 200 within the inlet chamber 168. In this example, the blower plate 210 may provide further baffling or muffling effect due to its being disposed axially between the blower fan 202 and the inlet chamber 168.

Hence, the present disclosure provides examples of a modular fan cover assembly for selectively arranging an electric motor to reduce noise by selectively rearranging the airflow path through the fan cover assembly. To facilitate modularity and selective configuration of the electric motor for various degrees of noise reduction, the modular fan cover assembly can include additional features. For example, referring to FIG. 3, the mounting holes 158 disposed in the mounting panel 154 can be arranged in various patterns to mount the inlet cover 160 and the silencing insert 170 to the fan cover 150. The mounting holes 158 may be arranged in a first mounting pattern 184 configured to align with corresponding holes on the inlet cover 160 to receive common fasteners and secure the inlet cover 160 to the fan cover 150. Additional mounting holes 158 can be arranged in a second mounting pattern 186 radially inward of the first mounting pattern 184 and aligned with corresponding holes on the silencing insert 170. Hence, mounting of the inlet cover 160 and silencing insert 170 to the fan cover 150 does not interfere with each other. In other examples, the first and second mounting patterns may be superimposed on each other to form a common mounting pattern, thereby reducing the number of fasteners need to assemble the modular fan cover.

Referring to FIG. 8, when the blower assembly 200 is included, the peripheral edge of the blower plate 210 on the blower assembly 200 may be sized and shaped to fit within mounting rim 166 of the inlet cover 160. The blower plate 210 may define a third mounting pattern 214 of mounting holes to accommodate fasteners that is arranged to interface with second mounting pattern 186 of reduced diameter on the fan cover shown in FIG. 3. Hence, when the blower assembly 200 is substituted for the silencing insert, the third mounting pattern 214 on the blower plate 210 enables utilization of the same second mounting pattern 186 on the fan cover 150 as the silencing insert, further facilitating modularity of the fan cover assembly. Moreover, because the blower assembly 200 utilizes the smaller second mounting pattern on the fan cover, the larger first mounting pattern is unobstructed and can interface with the corresponding fastener mounting pattern disposed about the mounting rim 166 of the inlet cover 160.

A possible advantage of the modular fan cover assembly according to some of the foregoing examples is enabling the selective configuration of the electric motor for reduced noise operation at the time of assembly of the motor or after installation in the field. Hence, the electric motor may be custom built for its intended operation or can be modified once installed in field. A possible related advantage of some examples is that the modular fan cover assembly can be configured for use across a plurality of standardized motor frame sizes and configurations. Another possible advantage of some examples is that modular fan cover assembly can be selectively configurable with a blower assembly for forcibly directing air into or over the motor for added cooling. These and other advantages and features of the disclosure will become apparent from the detailed description and the accompanying drawings All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An electric motor comprising: a motor housing extending between a front end housing and a rear end housing; a motor shaft protruding from the front end housing and defining a motor axis; and a modular fan cover assembly mounted to the rear end housing, the modular fan cover assembly including: a fan cover mountable to the rear end housing and defining an enclosed space for accommodating an impeller; an inlet cover for reduced noise operation and selectively mountable to the fan cover, the inlet cover having a peripheral casing concentric to the motor axis and a rear faceplate normal to the motor axis defining an inlet chamber having a deep set cavity, the inlet cover including a plurality of inlet apertures in the peripheral casing for receiving ambient air radially into the inlet chamber; and a structurally rigid silencing insert configured for noise reduction and adapted to be selectively disposable within the inlet cover and providing fluid communication between the inlet chamber and the fan chamber, the silencing insert including one or more silencing features including a baffling pipe having an elongated shape configured to protrude within the inlet chamber to reduce noise.

2. The electric motor of claim 1, wherein the baffling pipe extends parallel to the motor axis to receive and direct airflow axially into the fan chamber.

3. The electric motor of claim 2, wherein the inlet apertures are disposed radially into a casing of the inlet cover to initially direct airflow radially into the inlet chamber.

4. The electric motor of claim 3, wherein the baffling pipe extends axially coextensive with the inlet apertures.

5. The electric motor of claim 4, wherein airflow radially entering from the inlet apertures is initially directed axially rearward by the baffling pipe.

6. The electric motor of claim 5, wherein the inlet cover includes a rear faceplate opposite and spaced apart from an inlet rim of the baffling pipe to redirect airflow axially forward into the baffling pipe.

7. The electric motor of claim 6, wherein the airflow entering from the plurality of inlet apertures is there after directed axially forward into the fan chamber when the silencing insert is not present.

8. The electric motor of claim 1, wherein the fan cover includes a first mounting pattern configured to receive threaded fasteners to mount the inlet cover and a distinct second mounting pattern configured to receive threaded fasteners to mount the silencing insert.

9. The electric motor of claim 1, further including blower assembly selectively mountable to the fan cover, the blower assembly including a blower fan operated by an auxiliary blower motor, the blower assembly arranged to direct airflow axially into the fan chamber when selectively mounted to the fan cover.

10. The electric motor of claim 9, wherein the inlet cover partially accommodates the blower assembly when selectively mounted to the fan cover.

11. The electric motor of claim 10, wherein the fan cover includes a first mounting pattern configured to receive fasteners to mount the inlet cover, a second mounting pattern configured to receive fasteners to mount the silencing insert, and the blower assembly include a third mounting pattern configured to interface with the second mounting pattern.

12. A modular fan cover assembly for an electric motor comprising: a fan cover adapted to mount to a motor housing and defining a motor axis of the electric motor, the fan cover defining a fan chamber for accommodating an impeller; an inlet cover adapted to mount to the fan cover and to define an inlet chamber having a deep set cavity, the inlet cover having a peripheral casing concentric to the motor axis and a rear faceplate normal to the motor axis including a plurality of inlet apertures in the peripheral casing for receiving ambient airflow radially into the inlet chamber; and a structurally rigid silencing insert adapted to be selectively disposed in the inlet cover and to provide fluid communication between the inlet chamber and the fan chamber, the silencing insert including silencing features including a baffling pipe having an elongated shape configured to protrude within the inlet chamber to reduce noise during operation of the electric motor.

13. The modular fan cover assembly of claim 12, wherein the baffling pipe adapted to extend into the inlet chamber when selectively assembled, the baffling pipe arranged to direct airflow axially into the fan chamber.

14. The modular fan cover assembly of claim 13, wherein the plurality of inlet apertures are radially disposed into a peripheral casing of the inlet cover and arranged to direct airflow radially inward.

15. The modular fan cover assembly of claim 14, wherein the fan cover includes a first mounting pattern configured to receive fasteners to mount the inlet cover and a second mounting pattern configured to receive fastener to mount the silencing insert.

16. The modular fan cover assembly of claim 12, further including a blower assembly selectively mountable to the fan cover, the blower assembly including a blower fan operated by an auxiliary blower motor, the blower assembly arranged to direct airflow axially into the fan chamber when selectively mounted to the fan cover.

17. The modular fan cover assembly of claim 16, wherein the fan cover includes a first mounting pattern configured to receive fasteners to mount the inlet cover, a second mounting pattern configured to receive fasteners to mount the silencing insert, and the blower assembly include a third mounting pattern configured to interface with the second mounting pattern.

* * * * *